US011962160B1

United States Patent
Lu et al.

(10) Patent No.: US 11,962,160 B1
(45) Date of Patent: Apr. 16, 2024

(54) GENERATOR CONTROL SYSTEM CAPABLE OF REALIZING SERIES-PARALLEL CONNECTION

(71) Applicant: CHONGQING DINKING POWER MACHINERY CO., LTD, Chongqing (CN)

(72) Inventors: Jinbo Lu, Chongqing (CN); Xiang Liu, Chongqing (CN); Yuansong Wu, Chongqing (CN); Shiqian Xie, Chongqing (CN); Hai Xu, Chongqing (CN)

(73) Assignee: CHONGQING DINKING POWER MACHINERY CO., LTD, Chongqing (CN)

( * ) Notice: Subject to any disclaimer, the term of this patent is extended or adjusted under 35 U.S.C. 154(b) by 0 days.

(21) Appl. No.: 18/112,506

(22) Filed: Feb. 22, 2023

(30) Foreign Application Priority Data

Jan. 12, 2023 (CN) .......................... 202320123818.7

(51) Int. Cl.
*H02J 3/42* (2006.01)
*H02J 3/44* (2006.01)

(52) U.S. Cl.
CPC . *H02J 3/42* (2013.01); *H02J 3/44* (2013.01)

(58) Field of Classification Search
CPC ...................................... H02J 3/42; H02J 3/44
USPC ....................................................... 307/71, 87
See application file for complete search history.

(56) References Cited

U.S. PATENT DOCUMENTS

| 9,287,418 B2* | 3/2016 | Nirantare | .................. H02J 1/10 |
| 2012/0007429 A1* | 1/2012 | Hantschel | ......... H01L 31/02021 307/71 |
| 2012/0013180 A1* | 1/2012 | Muto | ..................... B60L 58/21 307/9.1 |
| 2013/0155735 A1* | 6/2013 | Ilic | ......................... H02M 7/48 363/71 |

* cited by examiner

*Primary Examiner* — Hal Kaplan

(57) ABSTRACT

A generator control system capable of realizing series-parallel connection comprises a first generator, a second generator, a first inverter and a second inverter, wherein a power output terminal of the first generator is connected to a power input terminal of the first inverter, and a power output terminal of the second generator is connected to a power input terminal of the second inverter. The generator control system further comprises a series-parallel connection box, and the first inverter and the second inverter are connected to the series-parallel connection box. Various voltages and power can be provided through the change-over switch.

9 Claims, 1 Drawing Sheet

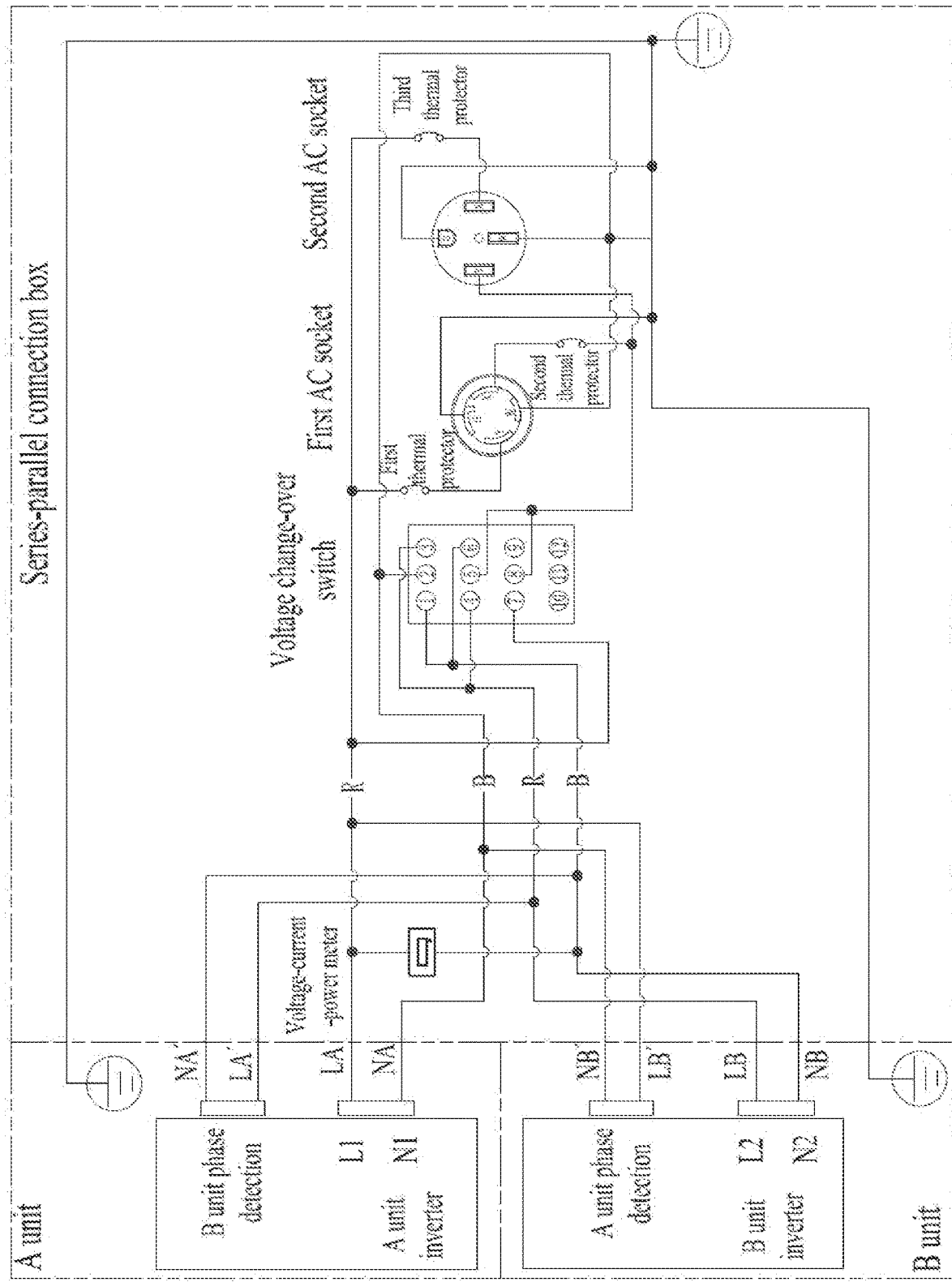

GENERATOR CONTROL SYSTEM CAPABLE OF REALIZING SERIES-PARALLEL CONNECTION

BACKGROUND OF THE INVENTION

1. Technical Field

The invention relates to the technical field of generator units, in particular to a generator control system capable of realizing series-parallel connection.

2. Description of Related Art

Generators are devices for converting mechanical energy into electric energy. The power of one generator is fixed. How to improve the power output of sockets is an issue to be settled at present.

BRIEF SUMMARY OF THE INVENTION

The invention aims to solve at least the technical problems of the prior art, and particularly and innovatively provides a generator control system capable of realizing series-parallel connection.

To fulfill the above aim, the invention provides a generator control system capable of realizing series-parallel connection, which comprises a first generator, a second generator, a first first inverter and a second inverter, wherein a power output terminal of the first generator is connected to a power input terminal of the first inverter, and a power output terminal of the second generator is connected to a power input terminal of the second inverter; and the generator control system further comprises a series-parallel connection box, and the first inverter and the second inverter are connected to the series-parallel connection box.

In a preferred embodiment of the invention, the series-parallel connection box comprises a box body, and a voltage change-over switch, a first AC socket and a second AC socket are disposed on the box body; the generator control system further comprises an A unit terminal and a B unit terminal;

The voltage change-over switch, the first AC socket and the second AC socket are connected to the A unit terminal and the B unit terminal through connecting wires.

In a preferred embodiment of the invention, the A unit terminal comprises A unit power input terminals and B unit phase detection terminals;

The A unit power input terminals comprise a first A unit power input terminal and an second A unit power input terminal;

The B unit phase detection terminals comprise a first B unit phase detection terminal and a second B unit phase detection terminal;

The B unit terminal comprises B unit power input terminals and A unit phase detection terminals;

The B unit power input terminals comprise a first B unit power input terminal and a second B unit power input terminal;

The A unit phase detection terminals comprise a first A unit phase detection terminal and a second A unit phase detection terminal;

The voltage change-over switch comprises a first voltage change-over switch terminal, a second voltage change-over switch terminal, a third voltage change-over switch terminal, a fourth voltage change-over switch terminal, a fifth voltage change-over switch terminal, a sixth voltage change-over switch terminal, a seventh voltage change-over switch terminal and an eighth voltage change-over switch terminal;

The first AC socket comprises a first AC socket terminal G, a second AC socket terminal, a third AC socket terminal and a fourth AC socket terminal;

The second AC socket comprises a fifth AC socket terminal, a sixth AC socket terminal, a seventh AC socket terminal and an eighth AC socket terminal;

The first A unit power input terminal, the first A unit phase detection terminal, the seventh voltage change-over switch terminal, the second AC socket terminal and the sixth AC socket terminal are connected through a connecting wire;

The second A unit power input terminal, the second A unit phase detection terminal, the second voltage change-over switch terminal, the fourth AC socket terminal and the eighth AC socket terminal are connected through a connecting wire;

The first B unit power input terminal, the first B unit phase detection terminal, the third voltage change-over switch terminal and the fourth voltage change-over switch terminal are connected through a connecting wire;

The second B unit power input terminal, the second B unit phase detection terminal, the first voltage change-over switch terminal and the sixth voltage change-over switch terminal are connected through a connecting wire;

The fifth voltage change-over switch terminal, the eighth voltage change-over switch terminal, the third AC socket terminal and the seventh AC socket terminal are connected through a connecting wire;

The first AC socket terminal G and the fifth AC socket terminal G are connected to a grounding wire terminal through a connecting wire;

A first power output terminal of the first inverter is connected to the first A unit power input terminal through a connecting wire, and a second power output terminal of the first inverter is connected to the second A unit power input terminal through a connecting wire;

A first phase detection input terminal of the first inverter is connected to the first B unit phase detection terminal through a connecting wire, and a second phase detection input terminal of the first inverter is connected to the second B unit phase detection terminal through a connecting wire;

A first power output terminal of the second inverter is connected to the first B unit power input terminal through a connecting wire, and a second power output terminal of the second inverter is connected to the second B unit power input terminal through a connecting wire;

A first phase detection input terminal of the second inverter B is connected to the first A unit phase detection terminal through a connecting wire, and a second phase detection input terminal of the second inverter is connected to the second A unit phase detection terminal through a connecting wire.

In a preferred embodiment of the invention, the generator control system further comprises a voltage-current-power meter, wherein a first power input terminal of the voltage-current-power meter is connected to the first A unit power input terminal through a connecting wire, and a second power input terminal of the voltage-current-power meter is connected to the second B unit power input terminal through a connecting wire. The voltage-current-power meter can display the voltage, current and power in real time.

In a preferred embodiment of the invention, the generator control system further comprises one or any combination of a thermal protector, a second thermal protector and a third thermal protector;

The first thermal protector is connected between the second AC socket terminal and the first A unit power input terminal;

The second thermal protector is connected between the third AC socket terminal and the fifth and eight voltage change-over switch terminals;

The third thermal protector is connected between the sixth AC socket terminal and the first A unit power input terminal. The thermal protectors can automatically disconnect a line in case of over-current, to guarantee the safety of the line.

In a preferred embodiment of the invention, the first thermal protector is a 30A thermal protector;

The second thermal protector and the third thermal protector are 50A thermal protectors.

In a preferred embodiment of the invention, the first generator and the first inverter constitute an A unit;

The second generator and the second inverter constitute a B unit;

The A unit and the B unit are disposed on a same frame.

In a preferred embodiment of the invention, the first generator is a first storage battery;

The second generator B is a second storage battery.

In a preferred embodiment of the invention, the voltage output by the first inverter and the second inverter is about 110V.

The invention has the beneficial effect that various voltages and power can be provided through the change-over switch.

BRIEF DESCRIPTION OF THE SEVERAL VIEWS OF THE DRAWINGS

The FIGURE is a circuit connection diagram of the invention.

DETAILED DESCRIPTION OF THE INVENTION

As shown in FIG. 1, a generator control system capable of realizing series-parallel connection comprises a first generator A, a second generator B, a first first inverter A and a second inverter B, wherein a power output terminal of the first generator A is connected to a power input terminal of the first inverter A, and a power output terminal of the second generator B is connected to a power input terminal of the second inverter B. The generator control system capable of realizing series-parallel connection further comprises a series-parallel connection box, and the first inverter A and the second inverter B are connected to the series-parallel connection box. The first inverter A and the second inverter B are inverters capable of outputting the same voltage (about 110V), the first inverter A is able to detect a phase output by the second inverter B and output power with the same phase as the second inverter B, and the second inverter B is able to detect a phase output by the first inverter A and output power with the same phase as the first inverter A. The inverters convert power generated by the generators into AC power with the same phase and voltage.

In a preferred embodiment of the invention, the series-parallel connection box comprises a box body, wherein a voltage change-over switch, a first AC socket and a second AC socket are disposed on the box body, the first AC socket and the second AC sockets are North American standard sockets such as American four-hole RV50A sockets NEMA 14-50R and American four-hole 30A sockets NEMA L14-30R. Specifically, the first AC socket is an American four-hole 30A socket NEMA L14-30R, and the second AC socket is an American four-hole RV50A socket NEMA 14-50R. The generator control system further comprises an A unit terminal and a B unit terminal.

The voltage change-over switch, the first AC socket and the second AC socket are connected to the A unit terminal and the B unit terminal through connecting wires.

In a preferred embodiment of the invention, the A unit terminal comprises A unit power input terminals and B unit phase detection terminals;

The A unit power input terminals comprise a first A unit power input terminal LA and an second A unit power input terminal NA;

The B unit phase detection terminals comprise a first B unit phase detection terminal LA' and a second B unit phase detection terminal NA';

The B unit terminal comprises B unit power input terminals and A unit phase detection terminals;

The B unit power input terminals comprise a first B unit power input terminal LB and a second B unit power input terminal NB;

The A unit phase detection terminals comprise a first A unit phase detection terminal LB' and a second A unit phase detection terminal NB';

The voltage change-over switch comprises a first voltage change-over switch terminal 1, a second voltage change-over switch terminal 2, a third voltage change-over switch terminal 3, a fourth voltage change-over switch terminal 4, a fifth voltage change-over switch terminal 5, a sixth voltage change-over switch terminal 6, a seventh voltage change-over switch terminal 7, an eighth voltage change-over switch terminal 8, a ninth voltage change-over switch terminal 9, a tenth voltage change-over switch terminal 10, an eleventh voltage change-over switch terminal 11 and a twelfth voltage change-over switch terminal 12; when the voltage change-over switch is in a first switch mode, the first voltage change-over switch terminal 1 and the second voltage change-over switch terminal 2 are connected, the fourth voltage change-over switch terminal 4 and the fifth voltage change-over switch terminal 5 are connected, the seventh voltage change-over switch terminal 7 and the eighth voltage change-over switch terminal 8 are connected, and the tenth voltage change-over switch terminal 10 and the eleventh voltage change-over switch terminal 11 are connected; when the voltage-change switch is in a second switch mode, the second voltage change-over switch terminal 2 and the third voltage change-over switch terminal 3 are connected, the fifth voltage change-over switch terminal 5 and the sixth voltage change-over switch terminal 6 are connected, the eighth voltage change-over switch terminal 8 and the ninth voltage change-over switch terminal 9 are connected, and the eleventh voltage change-over switch terminal 11 and the twelfth voltage change-over switch terminal 12 are connected.

The first AC socket comprises a first AC socket terminal G, a seventh AC socket terminal Y, a third AC socket terminal X and a fourth AC socket terminal W;

The second AC socket comprises a fifth AC socket terminal G, a sixth AC socket terminal X, a seventh AC socket terminal Y and an eighth AC socket terminal W;

As shown in FIG. 1, the first A unit power input terminal LA, the first A unit phase detection terminal LB', the seventh voltage change-over switch terminal 7, the second AC socket terminal Y and the sixth AC socket terminal X are connected through a first connecting wire;

The second A unit power input terminal NA, the second A unit phase detection terminal NB', the second voltage change-over switch terminal 2, the fourth AC socket terminal W and the eighth AC socket terminal W are connected through a second connecting wire;

The first B unit power input terminal LB, the first B unit phase detection terminal LA', the third voltage change-over switch terminal 3 and the fourth voltage change-over switch terminal 4 are connected through a third connecting wire;

The second B unit power input terminal NB, the second B unit phase detection terminal NA', the first voltage change-over switch terminal 1 and the sixth voltage change-over switch terminal 6 are connected through a fourth connecting wire;

The fifth voltage change-over switch terminal 5, the eighth voltage change-over switch terminal 8, the third AC socket terminal X and the seventh AC socket terminal Y are connected through a fifth connecting wire;

The first AC socket terminal G and the fifth AC socket terminal G are connected to a grounding wire terminal through a sixth connecting wire;

The grounding wire terminal is connected to a grounding wire of the first generator A and a grounding wire of the second generator B through a twenty-third connecting wire; or, the grounding wire is connected to a grounding wire of the first inverter A and a grounding wire of the second inverter B through the twenty-third connecting wire;

A first power output terminal of the first inverter A is connected to the first A unit power input terminal LA through a seventh connecting wire, and a second power output terminal of the first inverter A is connected to the second A unit power input terminal NA through an eighth connecting wire;

A first phase detection input terminal of the first inverter A is connected to the first B unit phase detection terminal LA' through a ninth connecting wire, and a second phase detection input terminal of the first inverter A is connected to the second B unit phase detection terminal NA' through a tenth connecting wire;

A first power output terminal of the second inverter B is connected to the first B unit power input terminal LB through an eleventh connecting wire, and a second power output terminal of the second inverter B is connected to the second B unit power input terminal NB through a twelfth connecting wire;

A first phase detection input terminal of the second inverter B is connected to the first A unit phase detection terminal LB' through a thirteenth connecting wire, and a second phase detection input terminal of the second inverter B is connected to the second A unit phase detection terminal NB' through a fourteenth connecting wire.

In a preferred embodiment of the invention, the generator control system further comprises a voltage-current-power meter, wherein a first power input terminal of the voltage-current-power meter is connected to the first A unit power input terminal LA through a fifteenth connecting wire, and a second power input terminal of the voltage-current-power meter is connected to the second B unit power input terminal NB through a sixteenth connecting wire.

When the voltage change-over switch is in the first switch mode, a live line of the first inverter A is connected to a live line of the second inverter B, a neutral line of the first inverter A is connected to a neutral line of the second inverter B in parallel, and the first inverter A and the second inverter B are in parallel connection; and when the voltage change-over switch is in the second switch mode, the neutral line of the first inverter A is connected to the live wire of the second inverter B, and the first inverter A and the second inverter B are in series connection. Different voltages or power is supplied to electric equipment through the first AC socket or the second AC socket.

In a preferred embodiment of the invention, the generator control system further comprises one or any combination of a thermal protector, a second thermal protector and a third thermal protector;

The first thermal protector is connected between the second AC socket terminal Y and the first A unit power input terminal LA, that is, the first A unit power input terminal LA, the first A unit phase detection terminal LB', the seventh voltage change-over switch terminal 7 and a first thermal protector terminal 1 are connected through a seventeenth connecting wire, and a first thermal protector terminal 2 is connected to the second AC socket terminal Y through an eighteenth connecting wire; and the first thermal protector is connected between the first thermal protector terminal 1 and the first thermal protector terminal 2.

The second thermal protector is connected between the third AC socket terminal X and the voltage change-over switch terminals 5 and 8, that is, the fifth voltage change-over switch terminal 5, the voltage change-over switch 8 and a second thermal protector terminal 1 are connected through a nineteenth connecting wire, and a second thermal protector terminal 2 is connected to the third AC socket terminal X through a twentieth connecting wire; and the second thermal protector is connected between the second thermal protector terminal 1 and the second thermal protector terminal 2.

The third thermal protector is connected between the sixth AC socket terminal X and the first A unit power input terminal LA, that is, the first A unit power input terminal LA, the first A unit phase detection terminal LB', the seventh voltage change-over switch terminal 7 and a third thermal protector terminal 1 are connected through a twenty-first connecting wire, and a third thermal protector terminal 2 is connected to the sixth AC socket terminal X through a twenty-second connecting wire; and the third thermal protector is connected between the third thermal protector terminal 1 and the third thermal protector terminal 2.

In a preferred embodiment of the invention, the first thermal protector is a 30A thermal protector;

The second thermal protector and the third thermal protector are 50A thermal protectors.

In a preferred embodiment of the invention, the first generator A and the first inverter A constitute an A unit;

The second generator B and the second inverter B constitute a B unit;

The A unit and the B unit are disposed on a same frame.

In a preferred embodiment of the invention, the first generator A is a first storage battery A;

The second generator B is a second storage battery B.

What is claimed is:

1. A generator control system capable of realizing series-parallel connection, comprising: a first generator, a second generator, a first inverter and a second inverter, wherein a power output terminal of the first generator is connected to a power input terminal of the first inverter, and a power output terminal of the second generator is connected to a power input terminal of the second inverter; and the generator control system further comprises a series-parallel connection box, and the first inverter and the second inverter are connected to the series-parallel connection box.

2. The generator control system capable of realizing series-parallel connection according to claim 1, wherein the series-parallel connection box comprises a box body, and a voltage change-over switch, a first AC socket and a second AC socket are disposed on the box body; the generator control system further comprises an A unit terminal and a B unit terminal;

the voltage change-over switch, the first AC socket and the second AC socket are connected to the A unit terminal and the B unit terminal through connecting wires.

3. The generator control system capable of realizing series-parallel connection according to claim 2, wherein the A unit terminal comprises A unit power input terminals and B unit phase detection terminals;

the A unit power input terminals comprise a first A unit power input terminal and a second A unit power input terminal;

the B unit phase detection terminals comprise a first B unit phase detection terminal and a second B unit phase detection terminal;

the B unit terminal comprises B unit power input terminals and A unit phase detection terminals;

the B unit power input terminals comprise a first B unit power input terminal and a second B unit power input terminal;

the A unit phase detection terminals comprise a first A unit phase detection terminal and a second A unit phase detection terminal;

the voltage change-over switch comprises a first voltage change-over switch terminal, a second voltage change-over switch terminal, a third voltage change-over switch terminal, a fourth voltage change-over switch terminal, a fifth voltage change-over switch terminal, a sixth voltage change-over switch terminal, a seventh voltage change-over switch terminal and an eighth voltage change-over switch terminal;

the first AC socket comprises a first AC socket terminal, a second AC socket terminal, a third AC socket terminal and a fourth AC socket terminal;

the second AC socket comprises a fifth AC socket terminal, a sixth AC socket terminal, a seventh AC socket terminal, and an eighth AC socket terminal;

the first A unit power input terminal, the first A unit phase detection terminal, the seventh voltage change-over switch terminal, the second AC socket terminal and the sixth AC socket terminal are electrically connected;

the second A unit power input terminal, the second A unit phase detection terminal, the second voltage change-over switch terminal, the fourth AC socket terminal and the eighth AC socket terminal are electrically connected;

the first B unit power input terminal, the first B unit phase detection terminal, the third voltage change-over switch terminal and the fourth voltage change-over switch terminal are electrically connected;

the second B unit power input terminal, the second B unit phase detection terminal, the first voltage change-over switch terminal and the sixth voltage change-over switch terminal are electrically connected;

the fifth voltage change-over switch terminal, the eighth voltage change-over switch terminal, the third AC socket terminal and the seventh AC socket terminal are electrically connected;

the first AC socket terminal and the fifth AC socket terminal are connected to a grounding wire terminal;

a first power output terminal of the first inverter is electrically connected to the first A unit power input terminal, and a second power output terminal of the first inverter is electrically connected to the second A unit power input terminal;

a first phase detection input terminal of the first inverter is electrically connected to the first B unit phase detection terminal, and a second phase detection input terminal of the first inverter is electrically connected to the second B unit phase detection terminal;

a first power output terminal of the second inverter is electrically connected to the first B unit power input terminal, and a second power output terminal of the second inverter is electrically connected to the second B unit power input terminal;

a first phase detection input terminal of the second inverter is electrically connected to the first A unit phase detection terminal, and a second phase detection input terminal of the second inverter is electrically connected to the second A unit phase detection terminal.

4. The generator control system capable of realizing series-parallel connection according to claim 3, further comprising a voltage-current-power meter, wherein a first power input terminal of the voltage-current-power meter is electrically connected to the first A unit power input terminal, and a second power input terminal of the voltage-current-power meter is connected to the second B unit power input terminal.

5. The generator control system capable of realizing series-parallel connection according to claim 3, further comprising one or any combination of a first thermal protector, a second thermal protector and a third thermal protector, wherein:

the first thermal protector is connected between the second AC socket terminal and the first A unit power input terminal;

the second thermal protector is connected between the third AC socket terminal and the fifth voltage change-over switch terminal and the eighth voltage change-over switch terminal;

the third thermal protector is connected between the sixth AC socket terminal and the first A unit power input terminal.

6. The generator control system capable of realizing series-parallel connection according to claim 5, wherein the first thermal protector is a 30A thermal protector;

the second thermal protector and the third thermal protector are 50A thermal protectors.

7. The generator control system capable of realizing series-parallel connection according to claim 1, wherein the first generator and the first inverter constitute an A unit;

the second generator and the second inverter constitute a B unit;

the A unit and the B unit are disposed on a same frame.

8. The generator control system capable of realizing series-parallel connection according to claim 1, wherein the first generator is a first storage battery;

the second generator is a second storage battery.

9. The generator control system capable of realizing series-parallel connection according to claim 1, wherein a voltage output by each of the first inverter and the second inverter is about 110V.

* * * * *